United States Patent
Stewart

[11] 4,024,899
[45] May 24, 1977

[54] LOCK NUT AND BOLT CONSTRUCTION

[76] Inventor: Mary L. W. Stewart, 87 Townsend St., Fitchburg, Mass. 01420

[22] Filed: Mar. 9, 1976

[21] Appl. No.: 665,339

[52] U.S. Cl. .......................................... 151/14 R
[51] Int. Cl.² .................................... F16B 39/30
[58] Field of Search ............. 151/22, 14 R, 25 R, 151/9, 11, 10

[56] References Cited

UNITED STATES PATENTS

| 113,557 | 4/1871 | Pearson | 151/14 R |
|---|---|---|---|
| 1,365,884 | 1/1921 | Bayne | 151/14 R X |
| 1,881,749 | 10/1932 | Llewellyn | 151/14 R X |
| 2,177,005 | 10/1939 | Purtell | 151/22 |
| 2,301,181 | 11/1942 | Ilsemann | 151/22 |
| 3,186,464 | 6/1965 | Baumle | 151/22 |
| 3,517,176 | 6/1970 | Orlomoski | 151/22 |

FOREIGN PATENTS OR APPLICATIONS

| 842,548 | 7/1960 | United Kingdom | 151/22 |

Primary Examiner—Ramon S. Britts
Attorney, Agent, or Firm—Clarence A. O'Brien; Harvey B. Jacobson

[57] ABSTRACT

A semi-friction and interlocking operative association is provided between a threaded shank portion and a nut or similar device threadly engaged thereon whereby unwanted accidental loosening of the shank portion and the nut will not occur. The apex or crest portions of the threads on both the shank portion and bolt portions are provided with resilient integral tines and the valley portions of the threads on both the shank portion and nut are provided with recesses into which the resilient tines may be seated upon proper alignment of the tines with the recesses. Still further, at least one or more flank portions of the threads on the shank are provided with randomly spaced beads for tight wedging seated engagement with corresponding thread flank portions on the associated nut threads and at least the nut thread recesses have swingable spring-type tines mounted therein for interlocking engagement with associated resilient tines on the bolt threads.

9 Claims, 6 Drawing Figures

LOCK NUT AND BOLT CONSTRUCTION

BACKGROUND OF THE INVENTION

Heretofore various forms of locking type bolt and nut constructions have been designed. Various forms of these constructions are disclosed in U.S. Pat. Nos. 113,557, 3,176,746, 3,339,389, 3,477,337, and 3,517,717. However, for various reasons these previously known locking bolt and nut threaded connections have proven inefficient, at least under some working conditions.

BRIEF DESCRIPTION OF THE INVENTION

The locking bolt and nut construction of the instant invention includes specifically shaped resilient tines formed on the apex or peak portions of the threads on both the nut and bolt coacting slightly dished recesses in which corresponding tines may be seatingly received formed in the valley portions of the threads on both the nut and bolt portions. In addition, a modified form of the invention further utilizes raised beads formed on at least the flank portions of either the nut or bolt threads for tight seated engagement with the opposing thread flank portions.

The main object of this invention is to provide a locking nut and bolt construction of the threaded type and which will strongly resist loosening under vibrational forces and yet which may be repeatedly intentionally loosened and tightened without appreciably detering the locking capability thereof.

Another object of this invention, in accordance with the preceding object, is to provide a locking threaded connection between two relatively rotatable components of any type.

Still another object of this invention is to provide a locking threaded connection which may be varied slightly in construction so as to vary the locking capacity thereof.

A final object of this invention to be specifically enumerated herein is to provide a locking threaded nut and bolt connection in accordance with the preceding objects and which will conform to conventional forms of manufacture, be of simple construction and easy to use.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
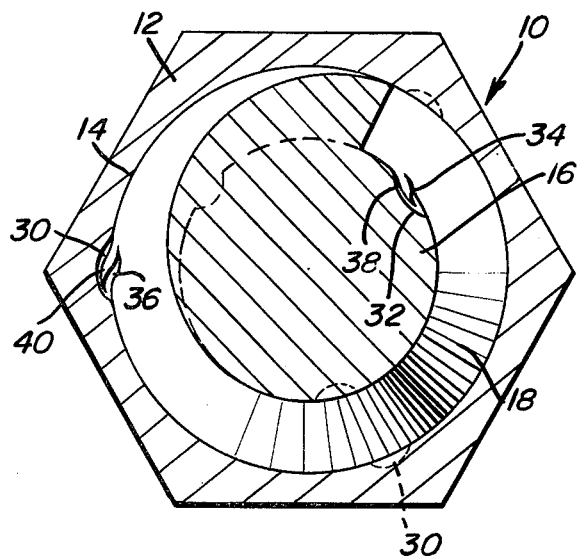
FIG. 1 is a cross-sectional view of a locking threaded nut and bolt assembly constructed in accordance with the present invention and taken upon a plane substantially flush with the near side of the nut component thereof.
Figure 2:
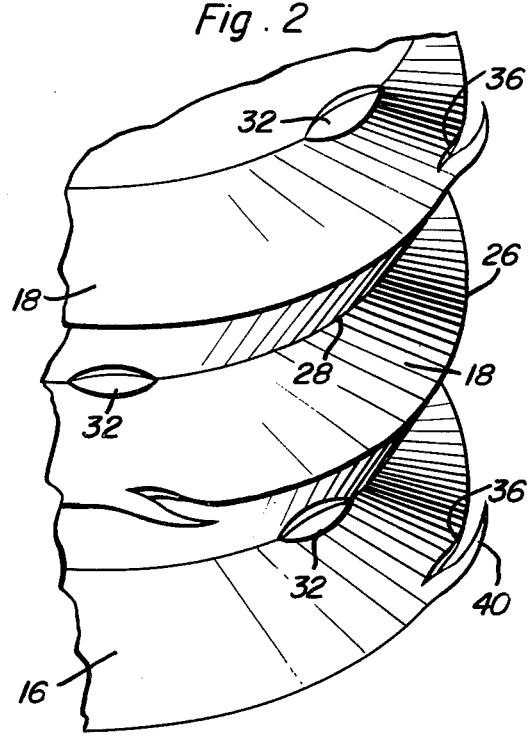
FIG. 2 is an enlarged fragmentary perspective view of the bolt component of the instant invention.
Figure 3:
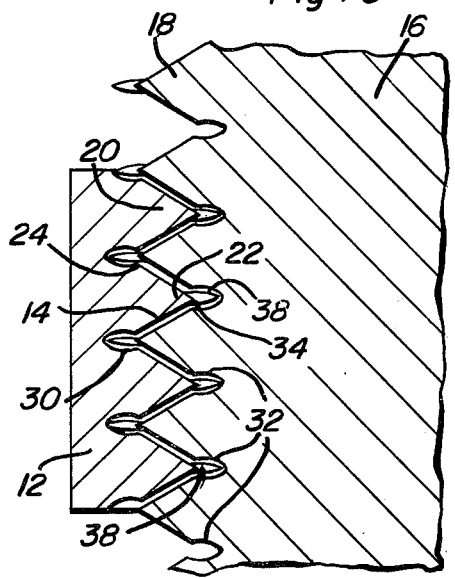
FIG. 3 is a fragmentary longitudinal sectional view taken substantially upon a plane passing through the longitudinal centerline of the locking threaded nut and bolt construction.

Referring now more specifically to the drawings, the numeral 10 generally designates the locking threaded nut and bolt construction of the instant invention. The construction includes a more or less conventional hexagonal nut 12 having a threaded bore 14 formed therethrough and a bolt or threaded shank portion 16 having helical threads 18 formed thereon.

The bore 14 includes helical threads 20 defining apex or crest portions 22 and valley or root portions 24. The threads 18 of the bolt 16 define similar apex or crest portions and valley or root portions 26 and 28. The portions 24 and 28 have spaced dished and elliptical recesses 30 and 32, respectively, therein at points spaced therealong and the apex portions 22 and 26 have corresponding peripherally extending cuts or notches 34 and 36 formed therein which define slightly outwardly deflected arcuate tines 38 and 40 extending along the corresponding apex portions 22 and 26. The tines 38 and 40 are seatingly receivable in the recesses 32 and 30, respectively, and it is to be understood that the tines 38 and 40 extend in the peripheral directions opposite to the directions of relative movement of the nut 12 and bolt 16 when the nut is being tightened on the bolt.

Because of the arched configuration of the tines 38 and 40 and the dished and elliptical configuration of the recesses 30 and 32 in which the tines 40 and 38 are receivable coupled with the resiliency of the tines, considerable resilience to relative rotation of the nut 12 and bolt 16 is afforded when such relative rotation takes place in a direction to loosen the threaded connection.

Further, at least those recesses 30 adjacent the opposite ends of the bore 14 include opposite side indentations 42 and 44 in which the opposite pointed ends of a spring extendable pivot shaft 46 are seated. Each pivot shaft 46 has a spring metal tine 48 pivoted therefrom and each tine includes a first end 50 seated in the corresponding recess and a second hooked end 52 engageable about a corresponding tine 40 seated in the recess 30. Therefore, a substantially vibration-proof threaded connection is defined between the nut 12 and the bolt 16.

Figure 4:
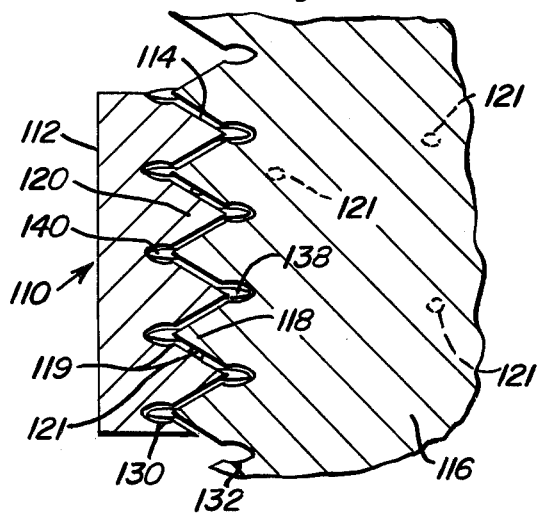
FIG. 4 is a fragmentary enlarged longitudinal sectional view similar to FIG. 3 but of a slightly modified form of locking nut and bolt connection.
Figure 5:
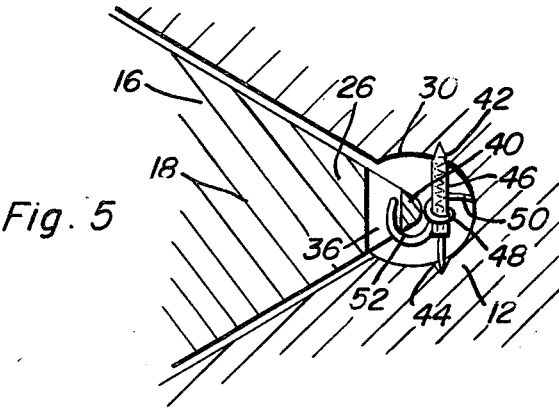
FIG. 5 is a fragmentary enlarged sectional view illustrating the mounting of the pivoted tines from the nut and their coaction with the stationary tines of the bolt.

With attention invited more specifically to FIG. 4 of the drawings, there may be seen a modified form of locking nut and bolt construction referred to in general by the reference numeral 110 and including many structural features similar to the various above-described features of the construction 10 and which are therefore designated by corresponding prime reference numerals in the 100 series.

The main difference between the construction 110 and the construction 10 is that the flank portions 119 of the threads 118 of the bolt 116 include raised beads 121 extending therealong for tight seated engagement with corresponding flank portions 121 of the threads 120 of the bolt 112. Of course, the tight seated engagement of the bead or beads 121 with the flank portions 121 of the threads 114 insures a tighter frictional engagement between the nut 112 and the bolt 116. Also, the bolt 16 may include beads corresponding to the beads 121 and the nut 112 may include tines corresponding to tines 48. Further, tines 48 may also be included in the recesses 32 of the bolt 16.

Figure 6:
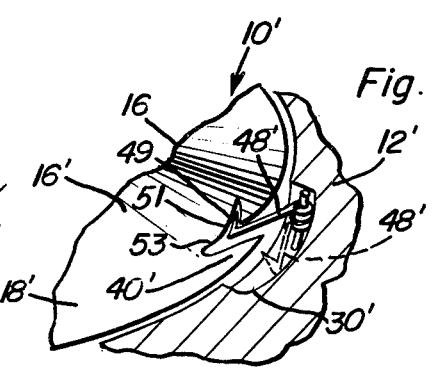
FIG. 6 is a fragmentary perspective view illustrating coacting bolt and nut components of a further modified form of the invention.

The second modified form illustrated in FIG. 6 is designated by the reference numeral 10' and is similar to the constructon 10 including components similar to the components 42, 44, 46, 48, 50 and 52 (some of which are not shown) designated by corresponding prime reference numerals. The nut 12' includes recesses 30' similar to recesses 30, but with each recess 30' adjacent the end of the nut bore including a barbed spring metal tine 48' similar to the tine 48 and with its barbed end 49 seatable in a notch 51 formed in the area 53 defined behind the corresponding tine 40'. The tine 48' is spring biased to the position thereof illustrated in solid lines in FIG. 6 and retractable into the recess 30' to the phantom line position thereof in FIG. 6 upon initial threading of the nut 12' on the bolt 16'.

Of course, once the nut 12' has been slightly "backed off" after its initial installation in order to seat the barbed end 49 in the notch 51, the nut may not be further loosened.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, a first member having a threaded bore therein, a second member including a threaded shank portion threadedly engaged in said bore, the threads on each of said members including alternate spiral crest and root portions, the crest portions on at least one of said members including elongated integral tines spaced and facing in one direction therealong, said tines including root end portions formed integrally with the corresponding crest portions and free end portions overlying and spaced slightly outwardly of adjacent crest portions defining notches inwardly of said free end portions opening outwardly between said free end portions and said adjacent crest portions, said free end portions of said tines being at least slightly resilient and tapering in cross-sectional area toward their free ends, at least the root portions of the other member including elongated dished recesses formed therein at points spaced therealong, said dished recesses opening outwardly of the root portions of said other member, said tines being registrable with and at least partially receivable in said recesses, some of said dishes recesses including spring material tines mounted from said other member and in said some recesses for shifting between the retracted positions at least substantially fully retracted in the corresponding recesses and extended positions projecting outwardly of the corresponding recesses, said spring material tines being yieldingly biased toward said extended positions and engageable by said crest portions on said one member and said integral tines for displacement of said spring material tines toward their retracted positions, said spring material tines being shiftable toward their extended positions when opposed by said notches and the free end of said spring material tines being engageable in said notches behind said integral tines upon relative threaded movement of said first and second members to angularly displace said one member in said one direction relative to the other member.

2. The combination of claim 1 wherein said tines and recesses are randomly spaced along said crest and root portions of said one and other members, respectively.

3. The combination of claim 1 wherein said threads on said shank portion and in said bore include helical flank portions intermediate adjacent crest and root portions, the flank portions on the threads of at least one of said members including longitudinally spaced raised integral beads.

4. The combination of claim 3 wherein the crest and root portions of each of said members include tines and recesses, respectively.

5. The combination of claim 4 wherein said tines and recesses are randomly spaced along said crest and root portions of said first and second members.

6. The combination of claim 1 wherein said extendable and retractable tines include means for substantially permanent interlocking engagement with said first mentioned tines.

7. The combination of claim 1 wherein said spring tines and the corresponding threaded member include means pivotally supporting said spring tines from the corresponding threaded member for oscillatory shifting between the retracted and extended positions thereof about axes generally paralleling said bore.

8. The combination of claim 1 wherein the free ends of said spring material tines are barbed for interlocking engagement in said notches.

9. The combination of claim 1 wherein the free ends of said spring material tines are arcuate for releaseable engagement behind the free ends of said integral tines.

* * * * *